United States Patent [19]

Hirai et al.

[11] Patent Number: 5,554,851
[45] Date of Patent: Sep. 10, 1996

[54] PARALLEL PLANE HOLDING MECHANISM AND APPARATUS USING SUCH A MECHANISM

[75] Inventors: Yutaka Hirai, Tokyo; Osamu Takamatsu, Atsugi; Katsunori Hatanaka, Yokohama; Masaru Nakayama, Atsugi; Hiroyasu Nose, Zama; Takayuki Yagi, Tokyo; Yasuhiro Shimida, Atsugi, all of Japan

[73] Assignee: Canon Kabushiki Kaisha, Tokyo, Japan

[21] Appl. No.: 407,245

[22] Filed: Mar. 20, 1995

Related U.S. Application Data

[63] Continuation of Ser. No. 946,899, Sep. 18, 1992, abandoned.

[30] Foreign Application Priority Data

Sep. 24, 1991 [JP] Japan .................... 3-273289
Sep. 7, 1992 [JP] Japan .................... 4-238366

[51] Int. Cl.⁶ .................................... H01J 37/28
[52] U.S. Cl. ............... 250/442.11; 250/306; 310/309; 369/126
[58] Field of Search .............. 250/442.11, 440.11, 250/306, 307; 369/126; 310/309

[56] References Cited

U.S. PATENT DOCUMENTS

| | | |
|---|---|---|
| 4,381,672 | 5/1983 | O'Connor et al. ............ 310/309 |
| 4,668,865 | 5/1987 | Grimzewski et al. ............ 250/306 |
| 4,806,755 | 2/1989 | Duerig et al. ............ 250/306 |
| 4,831,614 | 5/1989 | Duerig et al. ............ 250/306 |
| 4,998,016 | 3/1991 | Nose et al. ............ 250/306 |
| 5,006,487 | 4/1991 | Stokes ............ 437/228 |
| 5,051,643 | 9/1991 | Dworsky et al. ............ 310/309 |
| 5,075,548 | 12/1991 | Kajimura ............ 250/306 |

FOREIGN PATENT DOCUMENTS

| | | |
|---|---|---|
| 0368550 | 4/1990 | European Pat. Off. . |
| 0368579 | 5/1990 | European Pat. Off. . |
| 0487003 | 5/1992 | European Pat. Off. . |
| 0491973 | 7/1992 | European Pat. Off. . |
| 4022711 | 1/1991 | Germany . |
| 63-161552 | 7/1988 | Japan . |
| 8912830 | 12/1989 | WIPO . |

*Primary Examiner*—Jack I. Berman
*Assistant Examiner*—Kiet T. Nguyen
*Attorney, Agent, or Firm*—Fitzpatricik, Cella, Harper & Scinto

[57] ABSTRACT

A parallel plane holding mechanism is constructed as follows. Beams are provided on the peripheral portion of a flat plate-shaped weight member. A base plate is provided so as to face the weight member. First and second electrodes are provided on both surfaces of the weight member and the base plate to face each other. A voltage is applied between the first electrode and the second electrode so that the distance between the weight member and the base plate is controlled to move the weight member to thereby hold a reference surface of the weight member to be parallel to a predetermined reference surface.

13 Claims, 11 Drawing Sheets

000
PARALLEL PLANE HOLDING MECHANISM AND APPARATUS USING SUCH A MECHANISM

This application is a continuation, of application Ser. No. 07/946,899 filed Sep. 18, 1992, now abandoned.

BACKGROUND OF THE INVENTION

1. Field of the Invention

The invention relates to a parallel plane holding mechanism which can arbitrarily hold a parallel state and an apparatus using such a mechanism.

2. Related Background Art

In the fields of an STM (Scanning Tunneling Microscope) as a technical field of the invention and a memory device using the principle of the STM, method of accessing a probe to an object to be measured or a recording medium denotes a very important technique. Particularly, a distance between the probe and the object to be measured or the recording medium needs to be controlled on the order of several angstroms to several tens angstroms and a precision of several angstroms to several tens angstroms is also necessary with respect to the in-plane direction. Since the distance between the probe and the measuring object or the recording medium is changed in dependence on the surface state of the measuring object or recording medium, it is necessary to perform a control such that the probe is allowed to approach in the direction perpendicular to the distance or the micro surface or the like. For this purpose, a manipulator which can perform a fine FF operation to a stage on which the recording medium has been put is used and, in order to incline the probe, a cylindrical type piezoelectric actuator (piezoelectric tube) is connected to the probe and controlled.

FIG. 1 shows a parallel plane holding mechanism using the piezoelectric tube which has conventionally been used. A radius of tube 1 is set to 16.5 mm, a thickness is set to 1.5 mm, and a length is set to 20 mm. By keeping voltages applied to two of four electrodes arranged around the tube 1 to 10 V, a plate-shaped member 2 connected to the piezoelectric tube 1 can be inclined by about $1.4 \times 10^{-6}$ rad.

In the above conventional example, however, with respect to the application of the memory device in particular, there are drawbacks such that it is difficult to integratedly construct the probe and the recording medium or recording head and the miniaturization is difficult. There is also a case where it is necessary to remove an IC for a driving circuit upon integration, so that manufacturing steps become complicated, and the like. On the other hand, with respect to the STM as well, there are problems such that the probe head portion is large and it is difficult to integrate the IC for the driving circuit.

SUMMARY OF THE INVENTION

It is an object of the invention to solve the above drawbacks and to provide a parallel plane holding mechanism which can easily obtain a parallel plane and in which a size is small and manufacturing steps are simple and also to provide an apparatus using such a mechanism.

To accomplish the above object, according to the invention, there is provided a parallel plane holding mechanism comprising: a structure having beams made of elastic members in a peripheral portion of a flat plate-shaped weight; a base plate arranged so as to face the weight; and electrodes arranged in both opposite surfaces of the weight and the base plate, wherein by applying voltages to the electrodes, the distance between the weight and the base plate is controlled and the structure and/or an object to be driven which is connected to the base plate are/is moved, thereby keeping a reference surface of the object in parallel with a predetermined reference surface.

A memory device according to the invention using the parallel plane holding mechanism mentioned above comprises: a structure having beams made of elastic members in the peripheral portion of a flat plate-shaped weight; a base plate arranged so as to face the weight; and electrodes arranged in both opposite surfaces of the weight and the base plate, wherein by applying voltages to the electrodes, the distance between the weight and the base plate is controlled and the structure and/or an object to be driven which is connected to the base plate are/is moved, thereby arbitrarily keeping a reference surface of the object in parallel with a predetermined reference surface, the structure is used as one of the recording head and the recording medium, and the predetermined reference surface is used as the other one of the recording medium and the recording head.

According to the parallel plane holding mechanism with the above construction and the memory device using such a mechanism, the voltages are applied to the opposite electrodes and the distance between the flat plate-shaped weight and the base plate is controlled, thereby arbitrarily keeping the reference surface of the object in parallel with an external reference surface, and on the other hand, the object to be driven or the recording medium which is connected to the base plate is three-dimensionally moved, thereby adjusting the positional relation with a stylus and arbitrarily keeping the parallel state.

DETAILED DESCRIPTION OF THE PREFERRED EMBODIMENTS

The invention will be described in detail hereinbelow on the basis of embodiments shown in the diagrams.

Figure 1:
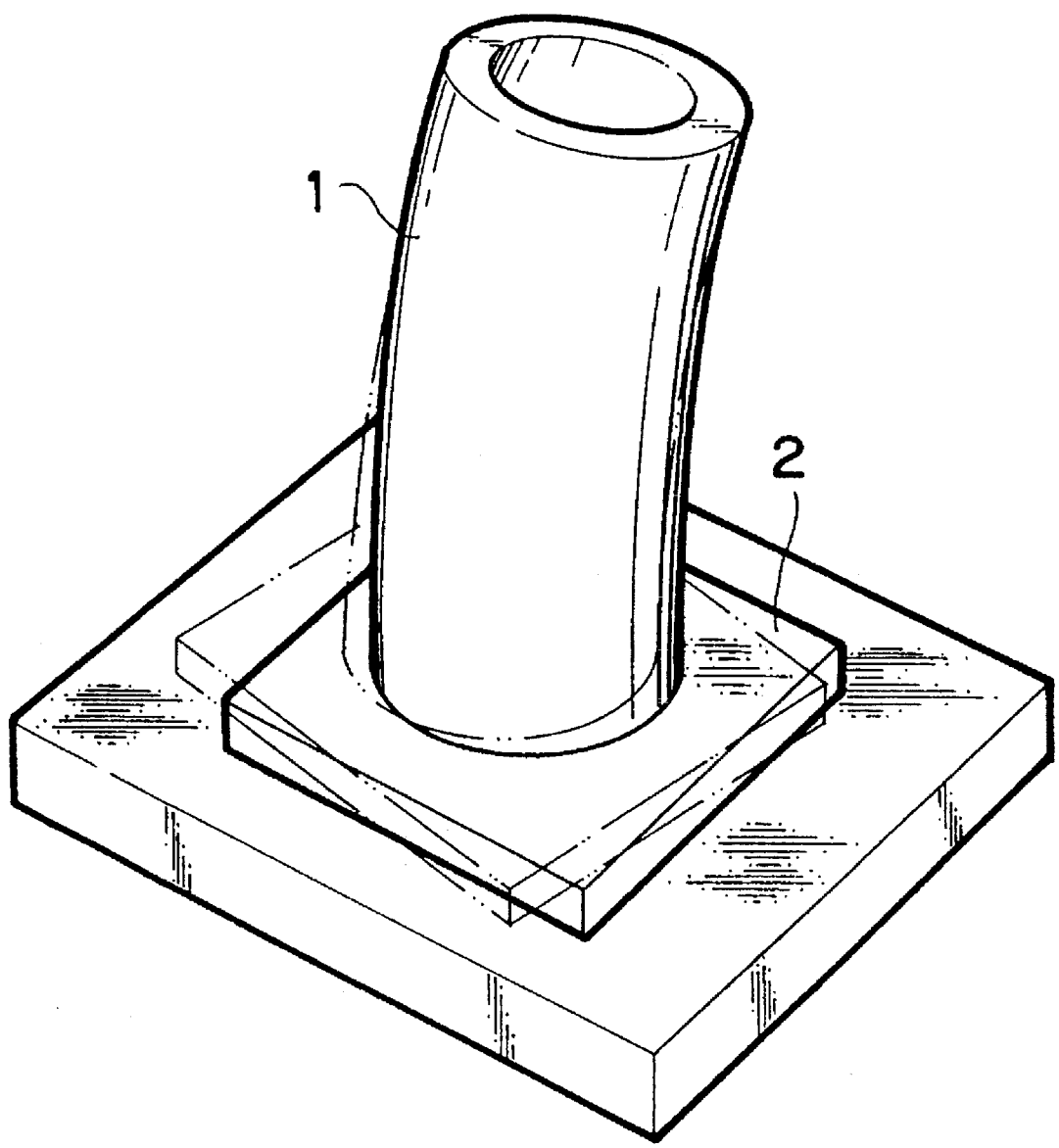
FIG. 1 is a perspective view of a conventional parallel plane holding mechanism.
Figure 2:
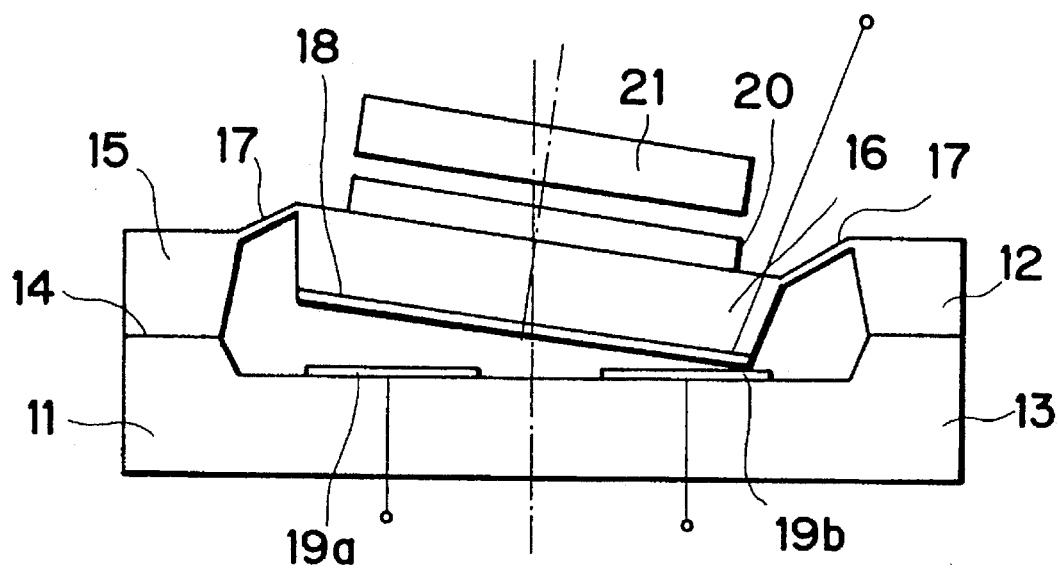
FIG. 2 is a cross sectional view of a first embodiment of a parallel plane holding mechanism.

FIG. 2 shows a cross sectional view of a fundamental structure of a parallel plane holding mechanism. A mechanism 11 has a structure in which a driver 12 and a base plate 13 are joined in a peripheral junction portion 14. The driver 12 comprises a supporting portion 15, a flat plate-shaped weight 16, and beams 17 made of elastic members. A flat plane-shaped electrode 18 is formed on a lower surface of the weight 16. Electrodes 19a and 19b are also formed on the base plate 13 so as to face the electrode 18. The driver 12 is mainly made of an Si monocrystalline material. The beam 17 as an elastic member is made of a material such as Si, $SiO_2$, $Si_3N_4$, or the like.

An object 20 to be held in parallel is attached on the flat plate-shaped weight 16. A distance and a positional relation between the object 20 and an object 21 locating at a spatially remote position can be arbitrarily controlled. The object 20 to be held in parallel may be also connected to the upper portion of the flat plate-shaped weight 16 as shown in FIG. 2 or may also have a structure such that it is constructed integratedly with the weight 16.

The actuation of the mechanism 11 is controlled by a voltage applied to the electrode 18 attached to the lower portion of the weight 16 and by voltages applied to the fixed electrodes 19a and 19b on the base plate 13. For instance, by connecting the electrode 18 to the ground and by applying a voltage +V to the electrode 19a and a voltage −V to the electrode 19b, an electrostatic attracting force and a repulsive force are generated by charges which are induced in the electrode 18. The weight 16 moves so as to widen the gap over the electrode 19a and to narrow the gap over the electrode 19b. The driving portion 12 and the base plate 13 are adhered so that the gap lies within a range from 0.5 to 20 μm in a balance state in which no voltage is applied. In a state in which the electrostatic attracting force and the repulsive force act by applying the voltages, the weight 16 moves from the position in the balance state due to the bending or extension of the beams 17. Thus, the object 20 put on the weight 16 can be moved and controlled to the position as shown in, for example, FIG. 2 from the position in the balance state which is parallel with the base plate 13.

The flat plate-shaped weight 16 is supported to the peripheral supporting portion 15 through a plurality of beams 17 made of the elastic members and has the electrode 18 on the lower surface. The electrodes 19a and 19b are formed on the upper surface of the base plate 13 so as to face the electrode 18. The peripheral junction portion 14 of the base plate 13 is adhered to the supporting portion 15. The weight 16 is driven by the electrostatic forces of the voltages which are applied to the electrodes 18, 19a and 19b. Electrostatic capacitances among the electrodes 18, 19a, and 19b are detected and a feedback control is executed so that the upper surface of the object 20 attached to the weight 16 is parallel with the lower surface of the external object 21. In this manner, the inclinations of the objects 20 and 21 are corrected.

As described above, the parallel plane holding mechanism of the invention comprises: the structure having the beams made of the elastic members in the peripheral portion of the flat plate-shaped weight; the base plate arranged so as to face the weight; and the electrodes arranged on both of the opposite surfaces of the weight and the base plate, wherein by applying the voltages to the electrodes, the distance between the weight and the base plate is controlled and the structure and/or the object to be driven which is connected to the base plate are/is moved, thereby keeping the reference surface of the object in parallel with a predetermined reference surface.

The above feedback control is constructed in a manner such that voltages are applied to the electrodes arranged to the weight and the base plate and a change in impedance is caused due to a change in capacitance by a change in gap, a change in partial voltage of the voltage between the electrodes is extracted as a signal and is fed back, thereby allowing an electrostatic force to act on the electrodes so as not to deviate the weight and the base plate.

The above feedback control can be also constructed in a manner such that a current is supplied to either one of coils which are formed from the electrodes arranged to the weight and the base plate, a change in impedance is caused due to a change in gap by the other one of the coils, a change in current between the electrodes is extracted as a signal and is fed back, thereby allowing an electromagnetic force to act on the electrodes so as not to deviate the weight and the base plate.

The following method is used as a method of forming the above parallel plane holding mechanism. For instance, the driving portion 12 uses an Si monocrystal as a raw material. A patterning mask of the portion to form the weight 16 is formed from the back surface of an Si wafer having front and back mirror surfaces by a desired pattern. An etching is executed by using an anisotropic etchant of Si such as KOH or the like in accordance with the patterning mask, thereby forming the driving portion 12 of a three-dimensional structure having the desired weight 16. In this instance, a thickness of the portion of the beam 17 is controlled by using a concentration dependent etching. With respect to the base plate 13 as well, a mask is formed in a manner similar to the driving portion 12 and the etching is executed by using the mask, so that a desired concave structure can be formed. With respect to the electrodes 18, 19a, and 19b, by patterning and etching the electrode materials which have been evaporation deposited on the whole surfaces of the driving portion 12 and the base plate 13, the electrodes of desired shapes are formed. Electrode wirings for leading out are directly led out from the electrodes 19a and 19b of the base plate 13 to the outside through the peripheral portion 14. An electrode wiring for leading out is led out from the electrode 18 of the weight 16 to the supporting portion 15 through the portion of the beam 17 and can be coupled to the outside.

Figure 3:
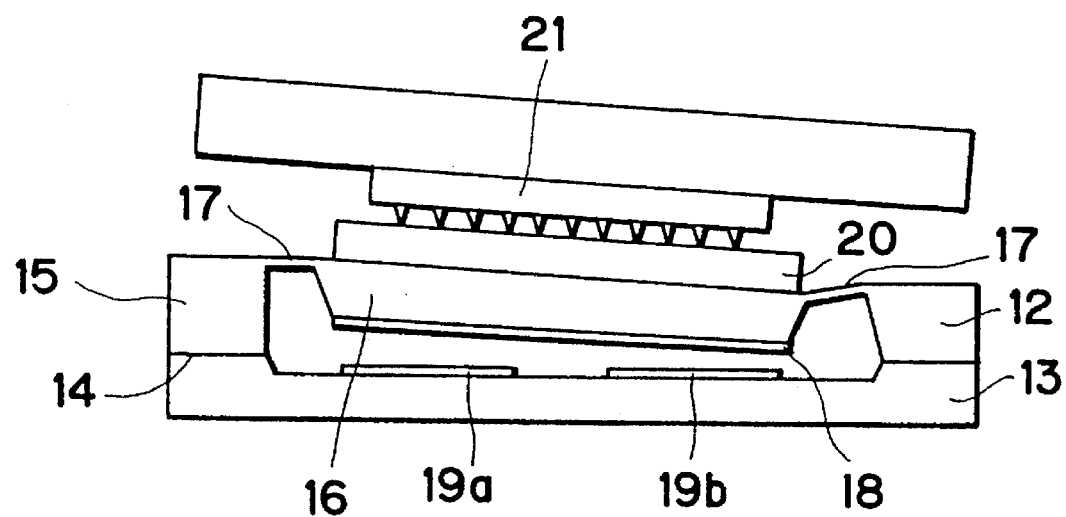
FIG. 3 is a cross sectional view of a memory device using the parallel plane holding mechanism.

In case of applying the above parallel plane holding mechanism to a memory device, as shown in FIG. 3, the object 20 is used as a recording medium and the object 21 is used as a recording head having a plurality of styli so that the distance between the recording medium and the recording head can be arbitrarily controlled. The same shall also apply to the case where the object 20 is used as a recording head and the object 21 is used as a recording medium.

Although the movement in the directions of two axes can be performed according to the structure of FIG. 2, the movement in the directions of three axes can be also realized by combining two sets of mechanisms 11 in FIG. 2 and overlappingly connecting so as to cross perpendicularly in the directions of the beam or by integrating them on the same base plate.

Figure 4:
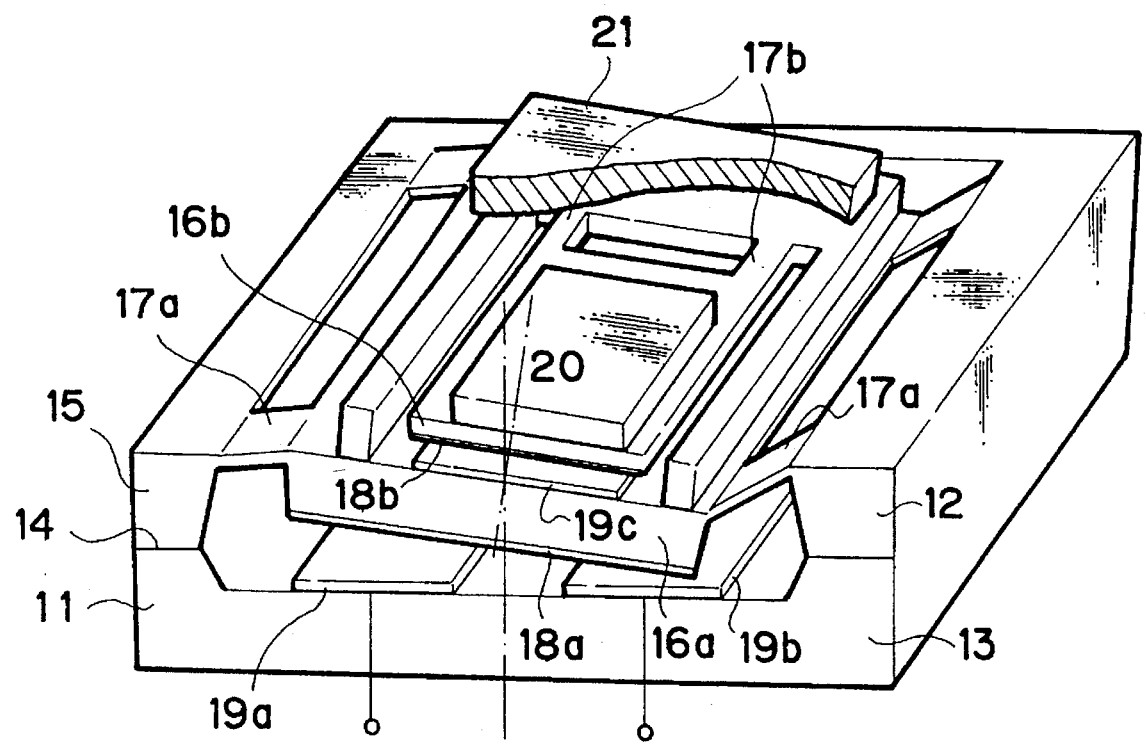
FIG. 4 is a cross sectional view of a modified structure of the first embodiment of the parallel plane holding mechanism.

FIG. 4 schematically shows an example in which such two sets of mechanisms are overlappingly connected.

The actuation of a mechanism 11' is controlled by voltages applied to an electrode 18a arranged under a weight 16a and to the fixed electrodes 19a and 19b on the base plate 13. Further, the actuation of the mechanism 11' is independently controlled by voltages applied to an electrode 18b arranged under a weight 16b and to fixed electrodes 19c and 19d (not shown) arranged on the weight 16a. That is, by independently moving lower beams 17a and 17b, the object can be moved in the directions of three axes.

Figure 5:
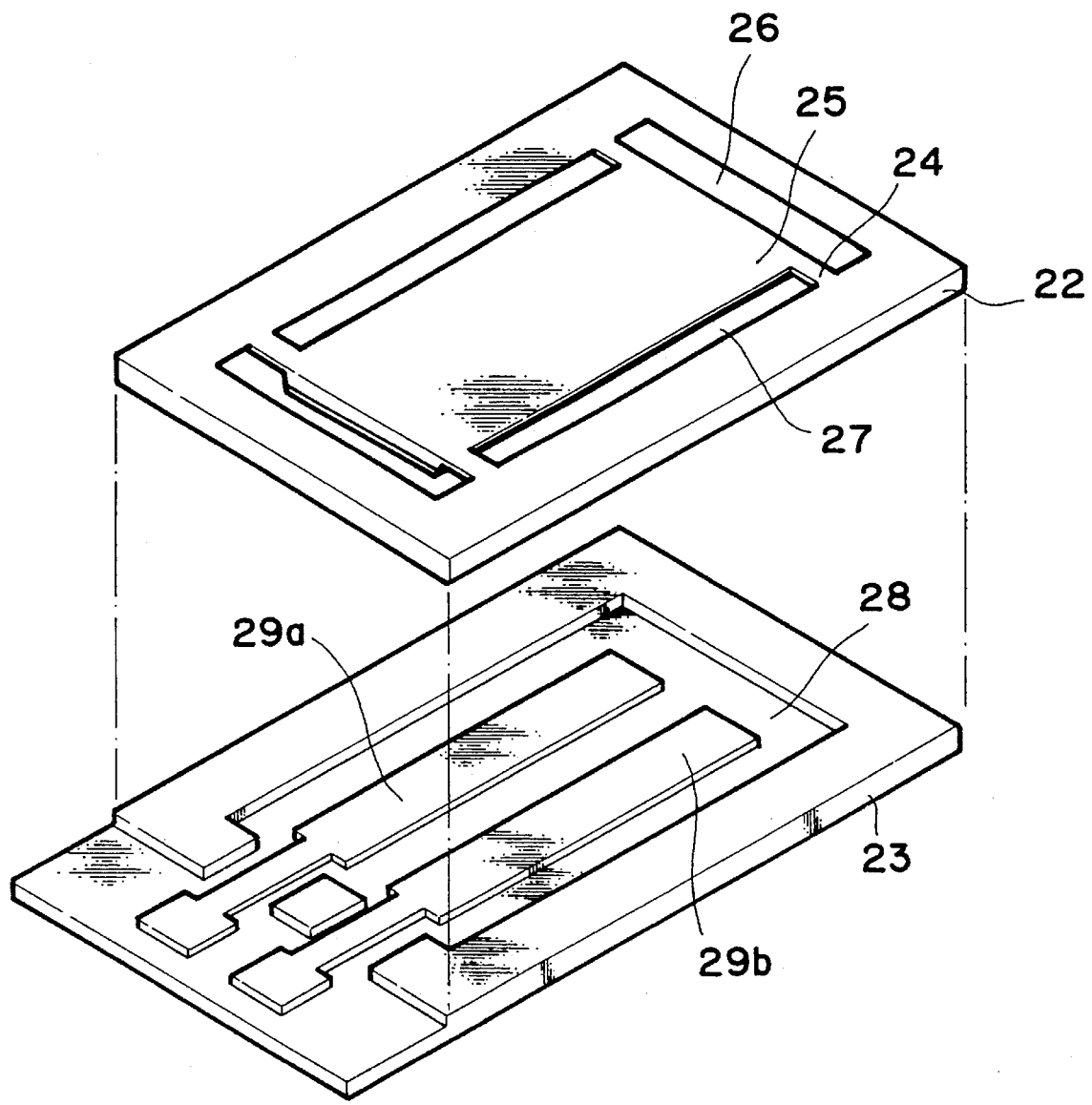
FIG. 5 is an exploded perspective view of the parallel plane holding mechanism.

FIG. 5 is an exploded diagram showing an example in which an Si substrate 22 of a 15-mm square and a thickness of 500 μm is used as a driving portion and a glass substrate 23 is used as a base plate. First, in order to form a p-type layer to the portion of a beam 24 of the upper surface of the n-type Si substrate 22, B ions are doped by an ion implantation using a mask. After that, an anisotropic etching is executed from the lower portion of the Si substrate 22 in an aqueous solution of 40% of KOH at a temperature of 100° C., thereby forming a flat plate-shaped weight 25. A hole portion 26 is subsequently formed. After that, an aluminum electrode 27 is formed on the whole surface of the lower portion of the weight 25. A concave portion 28 is formed on the glass substrate 23 by etching. Two aluminum electrodes 29a and 29b are formed in the concave portion 28 by patterning.

The glass substrate 23 is made of borosilicate glass or low alkali borosillicate glass (Pyrex glass made by Corning Glass Works Co., Ltd.) whose coefficient of thermal expansion is close to that of Si. When the glass substrate 23 is joined to the Si substrate 22, the glass substrate is heated to about 400° C. by using what is called an anode junction method, a negative voltage of about −500 V is applied to the glass substrate 23 side, and the glass substrate is chemically adhered to the Si substrate by an electrostatic force acting on the Si interface. After they were adhered, distances between the aluminum electrode 27 of the weight 25 and the electrodes 29a and 29b on the glass substrate 23 are set to about 1 to 5 μm.

The anode junction method is a method whereby the glass plate to be adhered and the junction plate are joined, a voltage is applied to them and a temperature is simultaneously raised, ions in the glass plate are moved and attracted by an electric field generated near the interface, and atoms are coupled, thereby adhering both of the plates.

Figure 6:
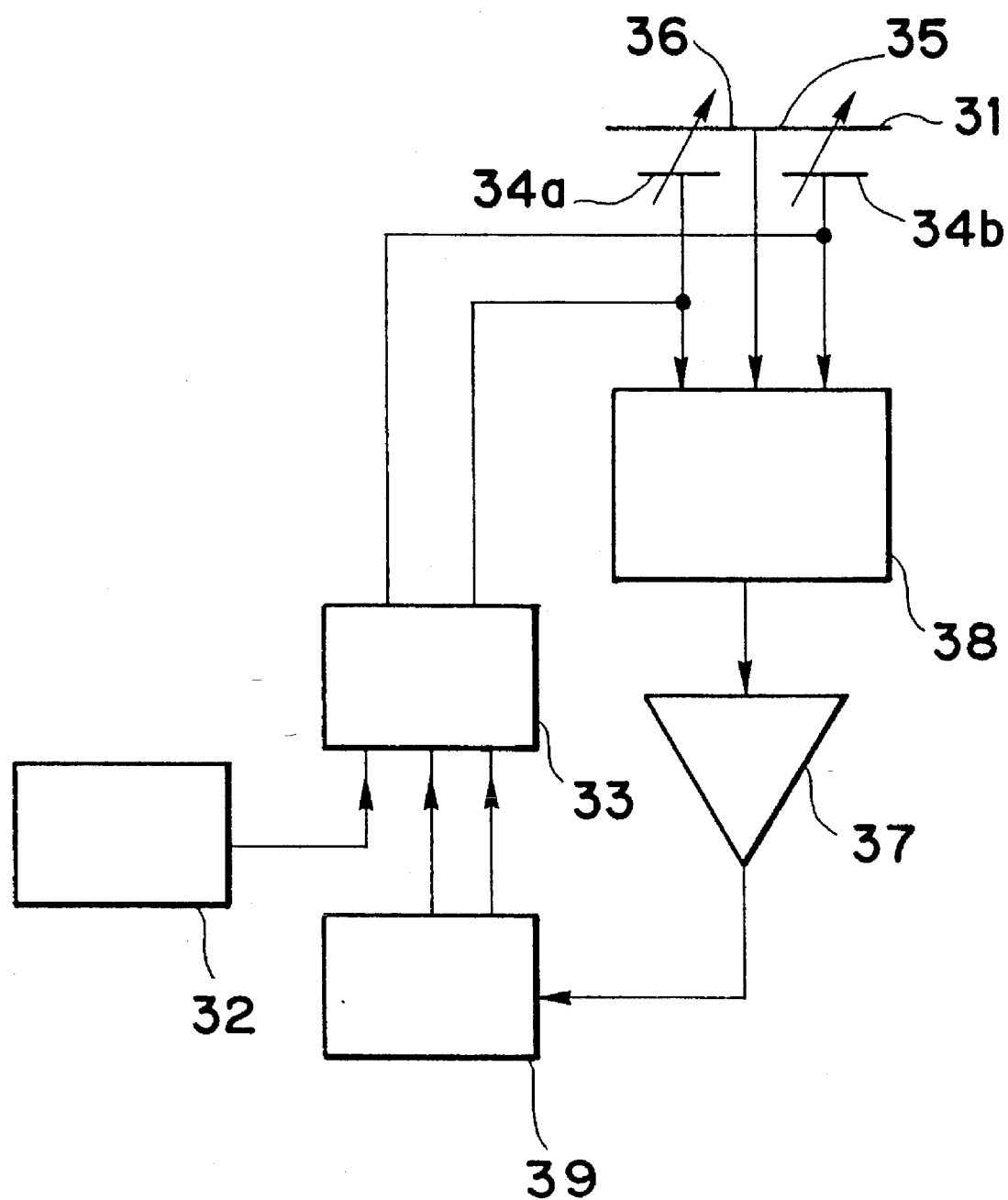
FIG. 6 is a constructional diagram of a control circuit of the parallel plane holding mechanism.

FIG. 6 shows a circuit to drive a parallel plane holding mechanism 31. A high frequency of a constant amplitude is applied from an oscillator 32 to fixed electrodes 34a and 34b through an adder 33. In this instance, when a capacitance between each fixed electrode and an electrode 36 of a weight 35 changes, an impedance changes and a partial voltage of the high frequency component changes. Therefore, such a change in partial voltage is converted into a signal of an angle of rotation of the weight 35 by a displacement detector 37. The displacement detector 37 extracts only the amplitude of the high frequency component by a detecting circuit 38 comprising a band pass filter and a full-wave rectifier and sets to a signal of a rotational angle. This signal is returned by a servo circuit 39. Driving voltages are applied to the fixed electrodes 34a and 34b through the adder 33 so that the rotational angle of the weight 35 is not deviated from the neutral position or initial set position, thereby allowing the electrostatic force to act. Consequently, the parallel state can be held for a displacement of 4 μm in the direction (Z axis) perpendicular to the direction (Y axis) of the beam. It has been known that by overlaying two parallel plane holding mechanisms 31 while intersecting the beams perpendicularly, the parallel state can be held for a displacement in an arbitrary direction.

Since the driving circuit to drive the parallel plane holding mechanism 31 has previously been designed and formed as an IC in the edge portion of the Si substrate 22, the mechanism as well as the driving portion has advantages such that it is very compact in size and is strong for noises.

Figure 7:
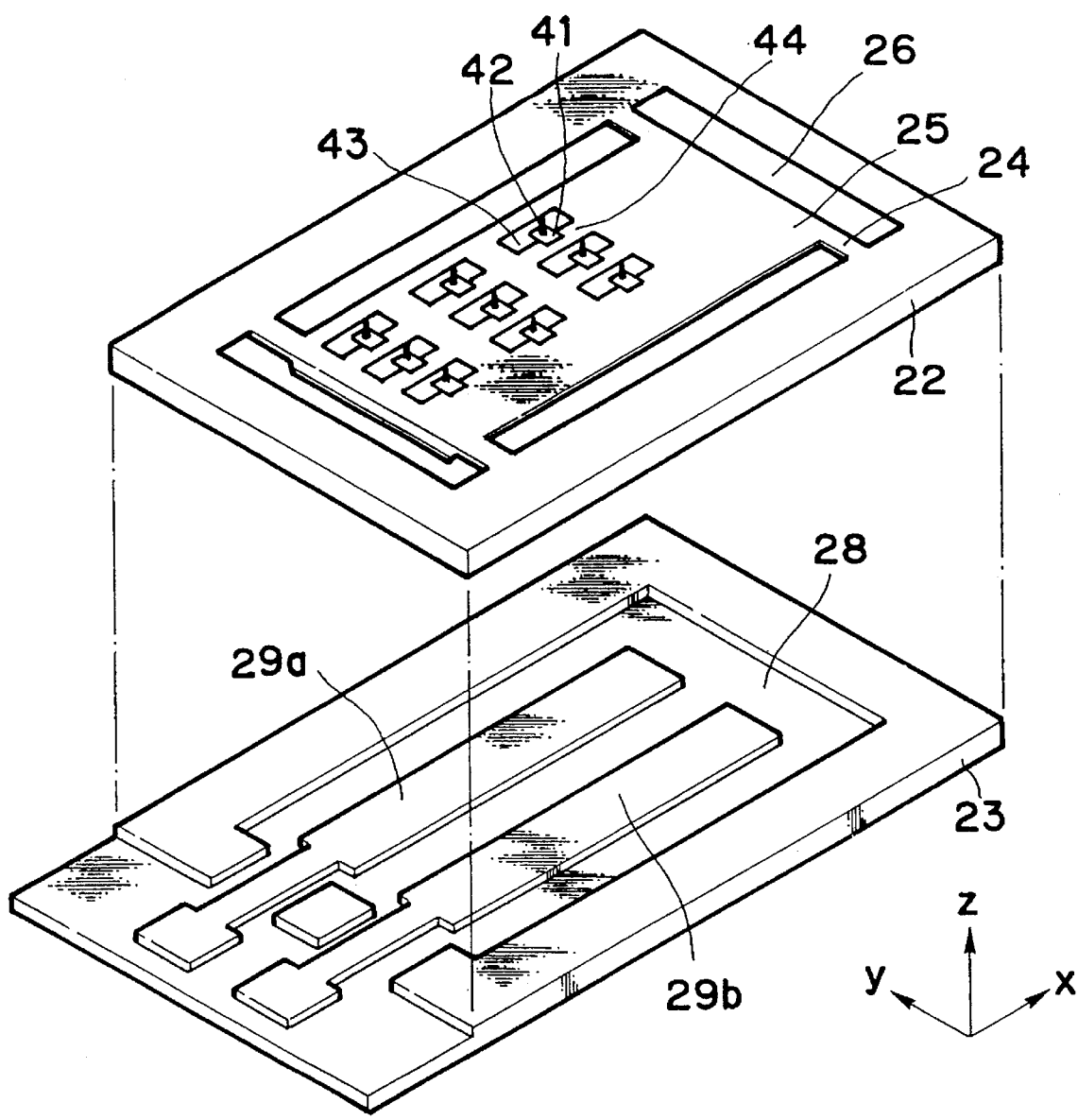
FIG. 7 is an exploded perspective view of a second embodiment of the parallel plane holding mechanism.

FIG. 7 shows the second embodiment and the same component elements as those shown in FIG. 3 are designated by the same reference numerals. An array of (3×3) cantilever type probes is arranged in a part of the weight 25 of a parallel plane holding mechanism having substantially the same construction as that of FIG. 3. A cantilever type probe 41 in the embodiment is of the cantilever beam type and constructs a piezoelectric element Bimorph type on an insulating layer on the substrate 22. The probe 41 is constructed by sequentially forming films in accordance with the order of a lower electrode, lower ZnO, a middle electrode, an upper ZnO, and an upper electrode and patterning. A stylus 42 is arranged in the edge portion of the probe 41. A part of the weight 25 is etched into a concave shape 43 by an anisotropic etching, thereby forming the probe 41. Although not shown, a driving circuit of the probe 41 and a circuit to amplify an electric signal from the stylus 42 have previously been constructed as an IC and integrated in a peripheral portion 44 of the probe 41.

As a result of the operation of the mechanism of the embodiment, it has been found that the parallel state of 5 μm or more can be held in a manner similar to the foregoing embodiment and that the probe 41 can be driven so as to give a displacement of 10 μm in the Z-axis direction and 1 μm in the X-axis direction to the stylus 42.

Figure 8:
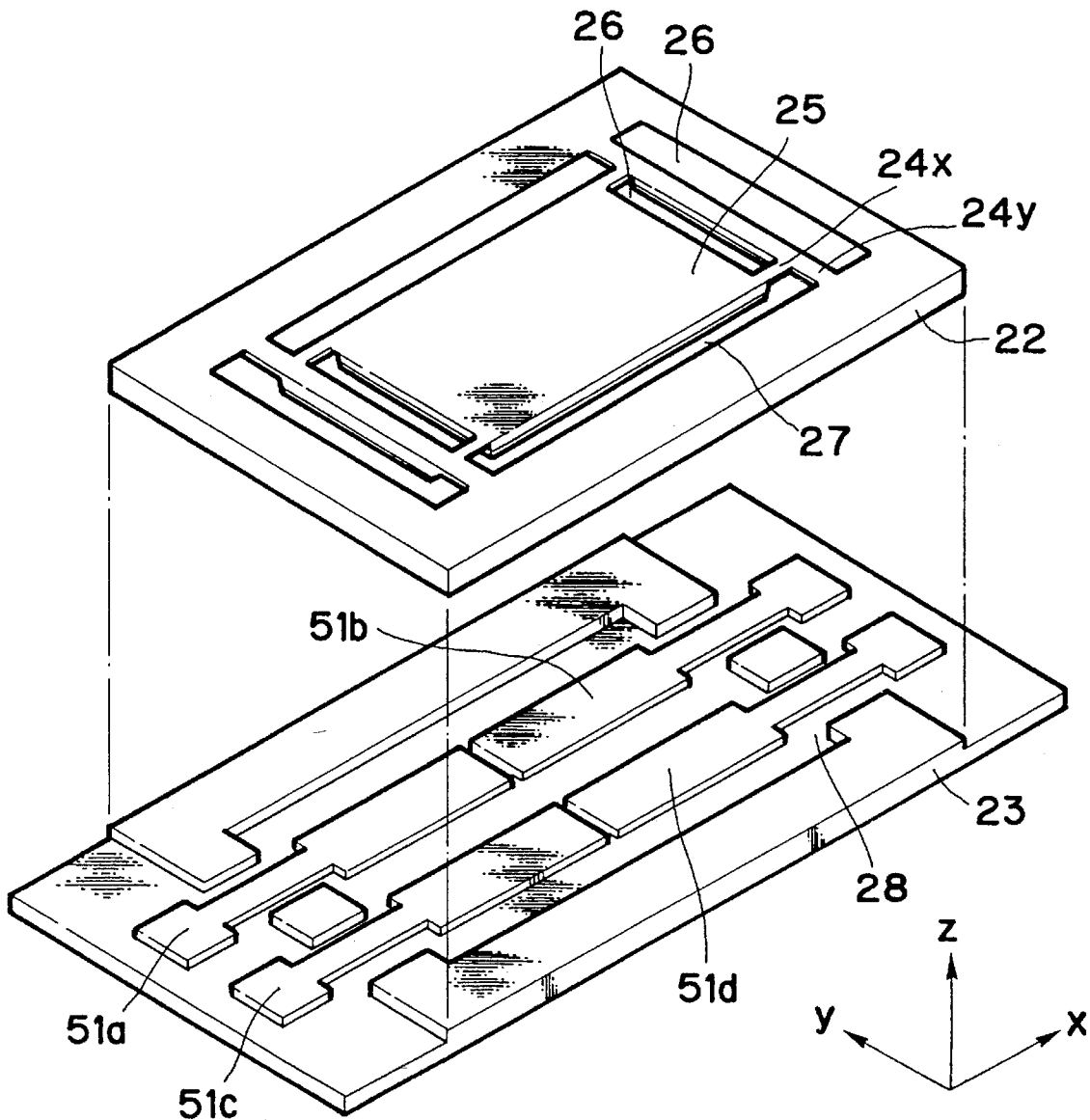
FIG. 8 is an exploded perspective view of a third embodiment of the parallel plane holding mechanism.
Figure 9A:
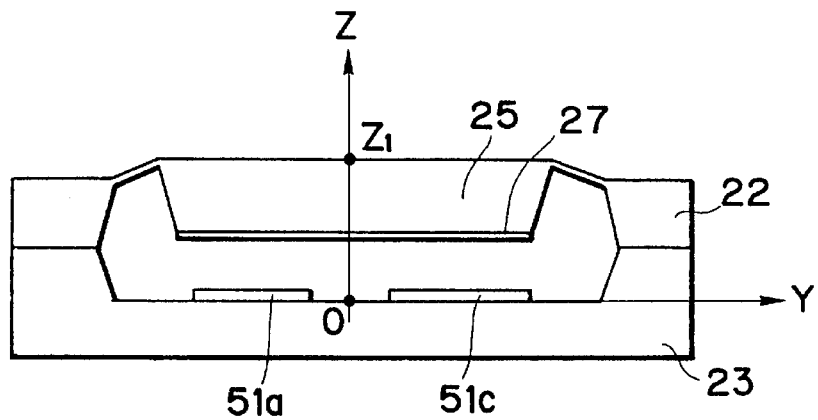
FIGS. 9A to 9D are diagrams showing a method of controlling the position in the direction of a Z axis according to the third embodiment of the parallel plane holding mechanism.
Figure 9B:
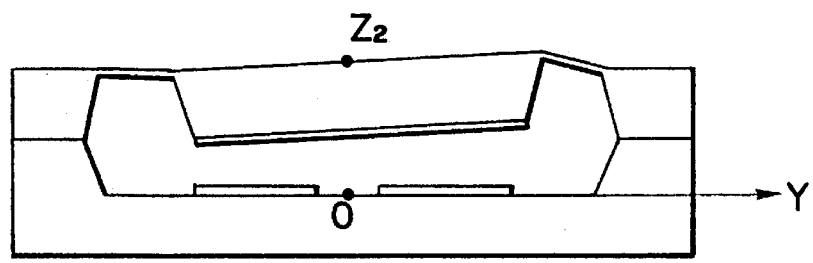
Figure 9C:
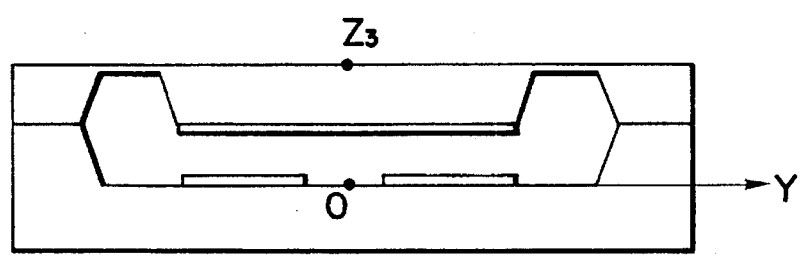
Figure 9D:
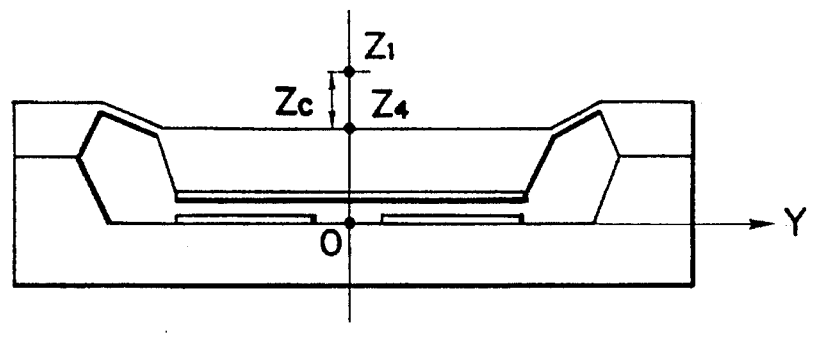

FIG. 8 relates to the third embodiment and shows an example of a parallel plane holding mechanism in which two kinds of beams are used to thereby enable a displacement to occur in the directions of three axes. As beams on the Si substrate, there are four beams 24y in the same axial direction (Y direction) as that in the first embodiment and four beams 24x in the axial direction (X direction) perpendicular to the Y direction. The beams 24x are supported through the beams 24y in the Y direction. Four fixed electrodes 51a, 51b, 51c, and 51d are arranged on the glass substrate 23. Independent voltages can be applied to those electrodes, respectively. An electrode 27 under the weight 25 has a single form or a two-divided form. As a result of that the mechanism was driven by using a circuit similar to that in the embodiment of FIG. 3, the displacements of three axes could be controlled.

Although the embodiment relates to the example in which one electrode 27 is used, the displacements can be controlled by a finer voltage change in case of using two electrodes.

As a result of that the mechanism was driven by using a circuit similar to that in the embodiment of FIG. 3, the displacements of three axes could be controlled.

A method of controlling the position in the vertical direction, namely, of the Z axis will now be described with reference to FIGS. 9A to 9D showing cross sectional views in the Y direction including the beams in FIG. 8. By controlling the voltages which are applied to the electrode 27 under the weight 25 and to the fixed electrodes 51a and 51c, the position from the 0 point to the weight surface changes from $Z_1$ to $Z_4$, so that a displacement of $Z_c$ in the Z-axis direction can be obtained.

Figure 10:
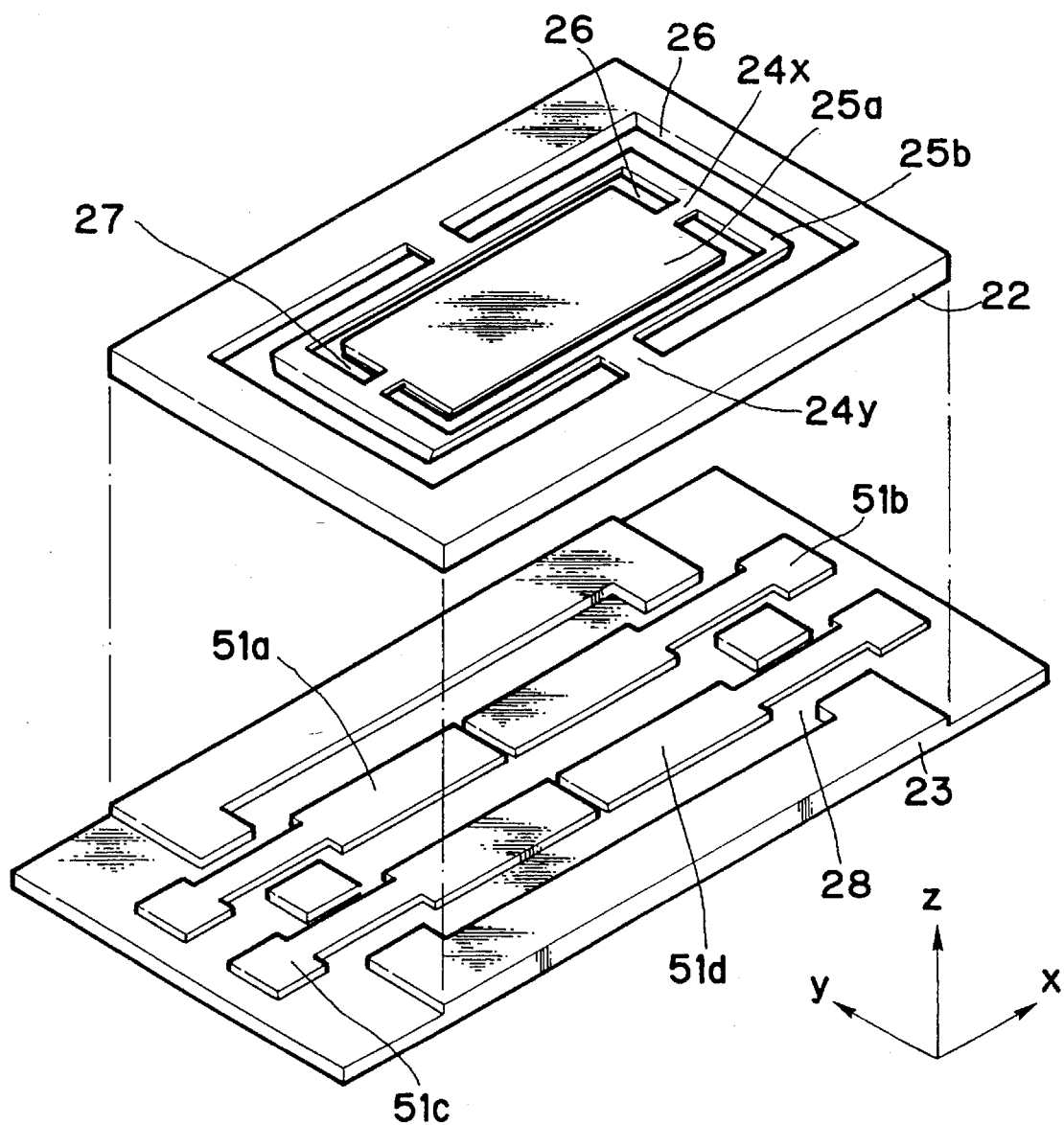
FIG. 10 is an exploded perspective view of a fourth embodiment of the parallel plane holding mechanism.

FIG. 10 relates to the fourth embodiment and shows an example in which a mechanism has a construction similar to that in the third embodiment of FIG. 8 and beams are arranged on the symmetrical axes of the weight 25. The weight 25 is separated to two weights 25a and 25b. The weights 25a and 25b are respectively coupled to the Si substrate 22 by the four beams 24y and 24x. The weight 25a is rotated around the X axis by using the beam 24x as an axis. The weight 25b is located around the weights 25a and supports the weight 25a through the beam 24x and is rotated around the Y axis by using the beam 24y as an axis. Thus, the weight 25a can perform displacements of three axes. Voltages can be independently applied to the fixed electrodes 51a, 51b, 51c, and 51d on the opposite glass substrate 22.

Although the embodiment relates to the example in which one electrode 27 is arranged under the weight 25a, a similar control can be realized even if the electrode 27 is divided into two electrodes so as to face the fixed electrodes 51a to 51d. A similar control can be also accomplished even when electrodes are divided and arranged to the weights 25a and 25b and two sets of electrodes are provided on the glass substrate 23 at the position which faces them.

Figure 11:
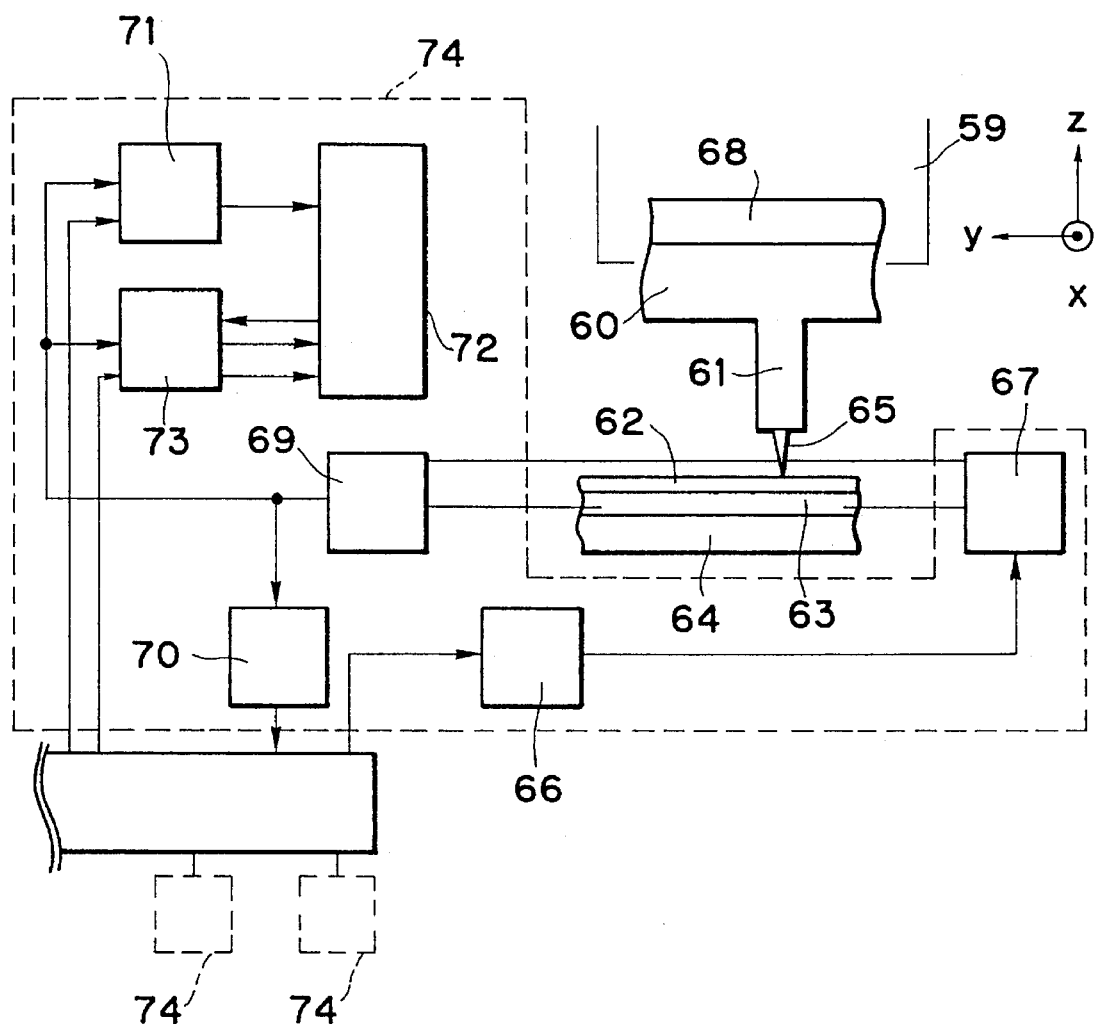
FIG. 11 is a constructional diagram of a memory device of a fifth embodiment using the parallel plane holding mechanism.

FIG. 11 relates to the fifth embodiment and shows a construction of a main section and a block diagram of a memory device using a parallel plane holding mechanism. The cantilever type probe 61 of the holding mechanism integrated type which has been mentioned in the second embodiment is arranged on a recording/reproducing head 60. The probes 61 are arranged so as to uniformly face the medium. Reference numeral 62 denotes a recording medium for recording information; 63 an under electrode to apply a voltage between the medium and the probe 61; and 64 a recording medium holder. The recording medium 62 is made of a material such as metal, semiconductor, oxide, or thin organic film which can deform the shape of the surface of the recording medium 62 into a convex or concave shape by a tunnel current which is generated from a probe 65 for a tunnel current at a tip of the probe 61. Or, the recording medium 62 is made of a thin organic film whose electrical characteristics change by the tunnel current and which has an electrical memory effect or the like. The recording/reproducing head 60 is arranged for a structure 59 of the parallel plane holding mechanism described in the foregoing embodiment.

As a thin organic film whose electrical characteristics change, a film made of a Langmuir-Blodgett (LB) film as described in Japanese Patent Application Laid-Open No. 63-161552 exhibits good characteristics. For instance, Cr of a thickness of 50 Å is deposited as an under electrode 63 onto a quartz glass substrate by a vacuum evaporation depositing method. Further, Au having a thickness of 300 Å is evaporation deposited onto the Cr under electrode by the same method. Four layers of SOAZ (squalillium-bis-octylazulene) are laminated onto the Au layer by an LB method. A resultant laminated film or the like is used as such a thin organic film.

Reference numeral 66 denotes a data modulating circuit to modulate data to be recorded into a signal suitable for recording. Reference numeral 67 denotes a recording voltage applying apparatus to record the signal modulated by the data modulating circuit 66 onto the recording medium 62 by applying a voltage between the recording medium 62 and the probe 61. When the probe 61 is allowed to approach the recording medium 62 up to a predetermined distance and a rectangular pulse voltage of, for example, 3 volts and a width of 50 nsec is applied by the recording voltage applying apparatus 67, the recording medium 62 causes a characteristic change, so that a low electric resistance portion occurs. Therefore, by executing the above operation by using an XY stage 68 while scanning on the surface of the recording medium 62 by the probe 61, information is recorded.

Although not shown, as a mechanism to scan by the XY stage 68, the parallel plane holding mechanism which is integrated with the recording/reproducing head 60 and a control mechanism such as differential micrometer, voice coil, inch worm, or the like which can perform a large stroke movement are used.

Reference numeral 69 denotes a recording signal detecting circuit to detect a tunnel current flowing between the probe 61 and the recording medium 62 by applying a voltage therebetween. Reference numeral 70 denotes a data demodulating circuit to demodulate the tunnel current signal detected by the recording signal detecting circuit 69. In the reproducing mode, the probe 61 and the recording medium 62 are set so as to have a predetermined distance and a DC voltage which is lower than the recording voltage, for instance, 200 mV is applied between the probe 61 and the recording medium 62. In this state, the tunnel current signal which is detected by using the recording signal detecting circuit 69 during the scan by the probe 61 along a recording data train on the recording medium 62 corresponds to the recording data signal. Therefore, by converting the tunnel current signal detected into the voltage and generating the voltage and demodulating by the data demodulating circuit 70, a reproduction data signal is derived.

Reference numeral 71 denotes a probe height detecting circuit. The detecting circuit 71 receives the detection signal of the recording signal detecting circuit 69 and processes the signal which remains after the high frequency vibration component due to the presence or absence of information bits was cut. The detecting circuit 71 generates a command signal to a drive control circuit 72 of the X and Z axes and the XY stage in order to vertically move and control the probe 61 so that the value of the remaining signal is equal to a predetermined value. Consequently, the distance between the probe 61 and the medium 62 is held almost constant. Further, reference numeral 73 denotes a track detecting circuit. When the probe 61 scans on the recording medium 62, the track detecting circuit 73 detects a deviation from the path along which the data of the probe 61 should be recorded or from the recorded data train, namely, the track.

A recording/reproducing circuit 74 is constructed by the foregoing data modulating circuit 66, recording voltage applying apparatus 67, recording signal detecting circuit 69, data demodulating circuit 70, probe height detecting circuit 71, X and Z axes and XY stage drive control circuit 72, and track detecting circuit 73. In the recording/reproducing head 60 shown in FIG. 8, one recording/reproducing circuit 74 is provided for each of a plurality of probes 61 which face the recording medium 62 and their driving mechanisms, respectively. The recording and reproduction by each probe 61, the tracking of each probe 61, and the displacement control such as distance adjustment or the like can be independently executed.

Although all of the above embodiments have been described on the assumption that the recording and reproducing operations are executed for the memory device, the invention can be also applied to a memory device to which only the recording or reproducing operation is performed.

An example in which the invention is applied to a scanning type tunnel current detecting apparatus will now be described.

Figure 12:
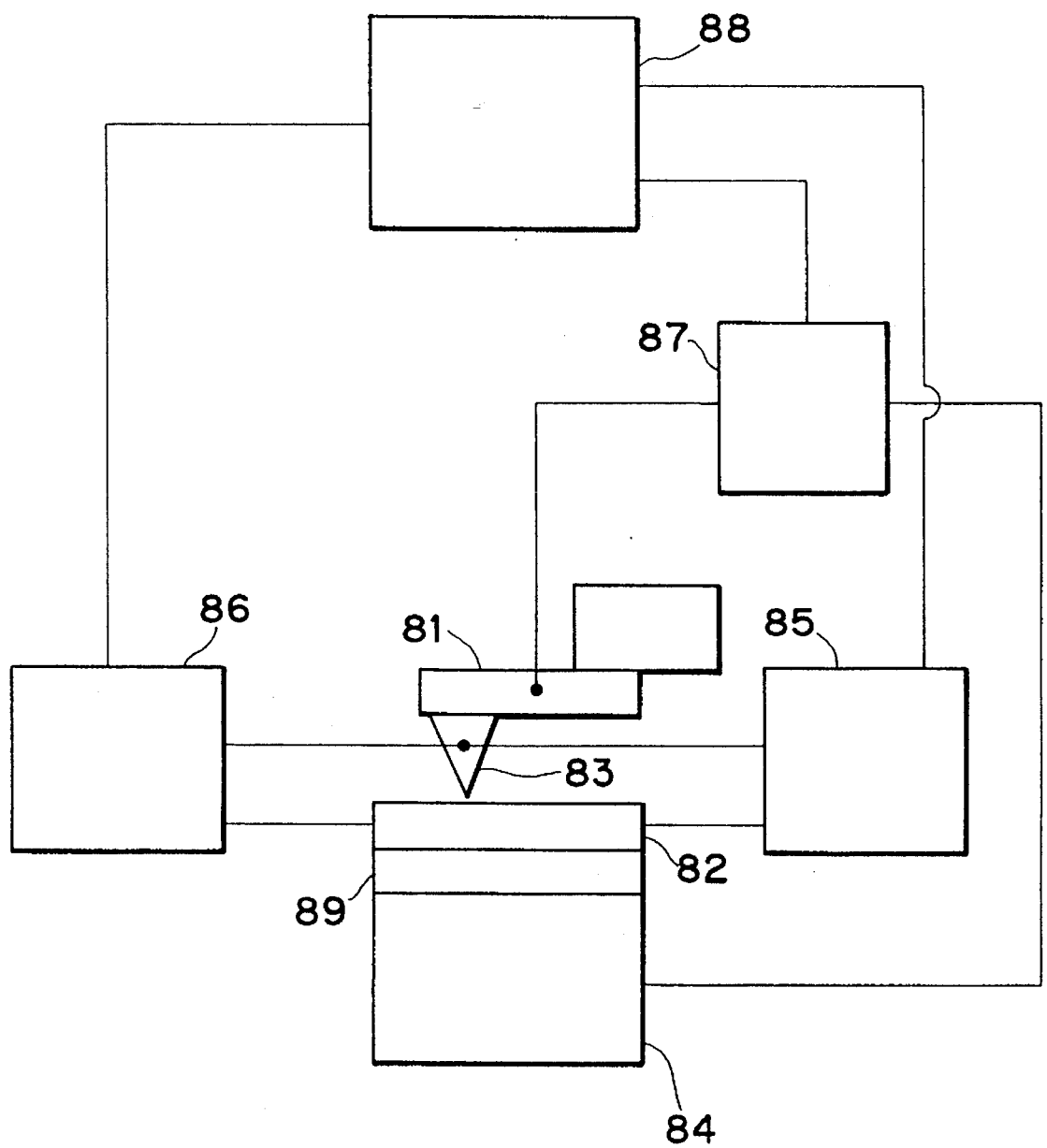
FIG. 12 is a constructional diagram of an STM apparatus of a sixth embodiment using the parallel plane holding mechanism.

FIG. 12 shows a block diagram of an STM apparatus manufactured by using the parallel plane holding mechanism of the invention. A probe 83 is allowed to approach a sample 82 by a cantilever type probe 81 of the cantilever beam shape used in the embodiment 2 (z direction). After that, the x direction in the plane of the sample 82 is scanned by a piezoelectric Bimorph mechanism provided in the cantilever and the y direction is scanned by an XY stage 84. Voltages are applied to the probe 83 and the sample 82 by a bias voltage applying circuit 85. A tunnel current which is observed at this time is read out by a tunnel current detecting amplifying circuit 86, thereby observing an image. A parallel plane holding mechanism 89 of the invention is arranged on the XY stage. The sample is fixed onto the holding mechanism 89. The distance between the sample 82 and the probe 83 is controlled by the Z control of the cantilever type probe and the parallel plane holding mechanism 89. The actuation of the XY stage 84 is controlled by a drive control circuit 87. A sequence control of the above circuits is executed by a CPU 88. Although not shown, as a scanning mechanism by the XY stage 84, a control mechanism such as cylindrical piezoelectric actuator, parallel spring, differential micrometer, voice coil, inch worm, or the like is used.

The memory device using the parallel plane holding mechanism according to the invention comprises: the structure having the beams made of the elastic members in the peripheral portion of the plane-shaped weight; the base plate arranged so as to face the weight; and the electrodes arranged on the opposite surfaces of the weight and the base plate, wherein the distance between the weight and the base plate is controlled by applying the voltages to the electrodes, the structure and/or the object to be driven which is connected to the base plate are/is moved, thereby arbitrarily keeping the reference surface of the object in parallel with a predetermined reference surface, the structure is set to either one of the recording head and the recording medium, and the predetermined reference surface is set to the other one of the recording medium and the recording head.

The STM apparatus using the parallel plane holding mechanism according to the invention comprises: the structure having the beams made of the elastic members in the peripheral portion of the plane-shaped weight; the base plate arranged so as to face the weight; and the electrodes arranged on the opposite surfaces of the weight and the base plate, whereby the distance between the weight and the base plate is controlled by applying the voltages to the electrodes, the structure and/or the object to be driven which is connected to the base plate is moved, thereby arbitrarily keeping the reference surface of the object in parallel with a predetermined reference surface, the structure is set to either one of the stylus to measure and sense and the object to be measured, and the predetermined reference surface is set to the other one of the measuring object and the stylus.

As described above, the parallel plane holding mechanism according to the invention and the apparatus using such a mechanism are effective for the parallel plane holding mechanism to hold the parallel plane and have an effect such that the noises are reduced when they are applied to the recording head to access to the recording medium. In the memory device, the probe and the recording medium or the recording head can be integrated together with an IC and a miniaturization can be realized. With respect to the STM as well, the miniaturization can be realized.

What is claimed is:

1. A parallel plane holding mechanism comprising:
    a flat plate-shaped member having a plurality of apertured portions and a plurality of beams extending from a peripheral portion thereof;
    a base plate disposed to face said member;
    a first electrode provided on a surface of said member which faces said base plate;
    a second electrode provided on a surface of said base plate which faces said member; and
    applying means for applying voltages to said first and second electrodes,
    wherein said member is moved by applying said voltages to said first and second electrodes by said applying means, said member maintaining a planar configuration during movement.

2. A mechanism according to claim 1, wherein said beams are made of elastic members.

3. A mechanism according to claim 1, wherein said flat plate-shaped member is mainly made of an Si material.

4. A memory device using a parallel plane holding mechanism, comprising:
    a flat plate-shaped member having a plurality of apertured portions and a plurality of beams extending from a peripheral portion thereof;
    a base plate disposed to face said member;
    a first electrode provided on a surface of the member which faces the base plate;
    a recording medium provided on said member;
    a recording head disposed to face said recording medium;
    a second electrode provided on a surface of the base plate which faces the member; and
    applying means for applying voltages to said first and second electrodes,
    wherein said member is moved by applying said voltages to said first and second electrodes by said applying means, said member maintaining a planar configuration during movement.

5. A device according to claim 4, wherein said beams are made of elastic members.

6. A device according to claim 4, wherein said flat plate-shaped member is mainly made of an Si material.

7. A mechanism according to claim 1, wherein said flat plate-shaped member has four beams each extending from said peripheral portion thereof.

8. A mechanism according to claim 7, wherein two of the four beams extend in a direction different from a direction in which the other two of the four beams extend.

9. A mechanism according to claim 1, wherein said second electrode comprises four electrode portions provided on the surface of said base plate to face said member.

10. A memory device using a flat plate-shape member having a plurality of beams extending from a peripheral portion thereof, comprising:
    a flat plate-shaped member having a plurality of apertured portions and a plurality of beams extending from a peripheral portion thereof;
    a base plate disposed to face said member;
    a first electrode provided on a surface of said member which faces said base plate;
    a recording head provided on said member;
    a recording medium disposed to face said recording head;
    a second electrode provided on a surface of said base plate which faces said member; and
    applying means for applying voltages to said first and second electrodes,
    wherein said member is moved by applying said voltages to said first and second electrodes by said applying means, said member maintaining a planar configuration during movement.

11. A device according to claim 10, wherein said beams are made of elastic members.

12. A device according to claim 10, wherein said flat plate-shaped member is mainly made of an Si material.

13. A scanning tunneling current detecting device using a flat plate-shaped member having a plurality of beams extending from a peripheral portion thereof, comprising:

a flat plate-shaped member having a plurality of apertured portions and a plurality of beams extending from a peripheral portion thereof;

a base plate disposed to face said member;

a first electrode provided on a surface of said member which faces said base plate;

a probe disposed to face said member;

a second electrode provided on a surface of said base plate which faces said member; and applying means for applying voltages to said first and second electrodes, wherein said member is moved by applying said voltages to said first and second electrodes by said applying means, said member maintaining a planar configuration during movement.

* * * * *